(12) United States Patent
Andrews et al.

(10) Patent No.: US 7,389,771 B2
(45) Date of Patent: Jun. 24, 2008

(54) CLOSED LOOP EGR CONTROL METHOD AND SYSTEM USING WATER CONTENT MEASUREMENT

(75) Inventors: Eric B. Andrews, Columbus, IN (US); Frederick H. Lindner, North Vernon, IN (US); Tim Frazier, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/513,002

(22) Filed: Aug. 30, 2006

(65) Prior Publication Data

US 2008/0053418 A1 Mar. 6, 2008

(51) Int. Cl.
*F02M 25/07* (2006.01)
*F02M 33/44* (2006.01)
*F02B 47/08* (2006.01)

(52) U.S. Cl. ............... 123/568.22; 123/704; 60/605.2
(58) Field of Classification Search ........... 123/568.21, 123/568.22, 677, 678, 698, 704; 701/103, 701/108; 73/117.3, 118.1
See application file for complete search history.

(56) References Cited

U.S. PATENT DOCUMENTS

| | | | |
|---|---|---|---|
| 4,168,683 A * | 9/1979 | Hata et al. ................. | 123/704 |
| 5,846,831 A | 12/1998 | Silvis | |
| 5,968,452 A | 10/1999 | Silvis | |
| 6,062,204 A * | 5/2000 | Cullen ................... | 123/568.22 |
| 6,467,469 B2 | 10/2002 | Yang et al. | |
| 6,480,782 B2 | 11/2002 | Brackney et al. | |
| 6,647,972 B2 * | 11/2003 | Sato et al. ............. | 123/568.16 |
| 6,725,848 B2 * | 4/2004 | Ramamurthy et al. . | 123/568.22 |
| 6,748,936 B2 * | 6/2004 | Kinomura et al. ..... | 123/568.22 |
| 6,823,268 B2 | 11/2004 | Silvis et al. | |
| 6,837,227 B2 | 1/2005 | Jaliwala et al. | |
| 6,899,090 B2 | 5/2005 | Arnold | |
| 6,918,362 B2 * | 7/2005 | Cullen ................... | 123/568.22 |
| 6,934,621 B2 * | 8/2005 | Bhargava et al. .......... | 701/108 |
| 6,954,693 B2 | 10/2005 | Brackney et al. | |
| 6,966,303 B2 | 11/2005 | Harunari et al. | |
| 7,104,228 B2 * | 9/2006 | Cullen ................... | 123/568.22 |
| 2003/0069703 A1 | 4/2003 | Rendahl et al. | |
| 2005/0032232 A1 | 2/2005 | Silvis et al. | |
| 2005/0072404 A1 * | 4/2005 | Cullen ................... | 123/568.22 |
| 2007/0095328 A1 * | 5/2007 | Brehob .................. | 123/568.22 |

* cited by examiner

*Primary Examiner*—Willis R Wolfe, Jr.
(74) *Attorney, Agent, or Firm*—Baker & Daniels

(57) ABSTRACT

The present invention provides an internal combustion engine system that includes an internal combustion engine system includes an internal combustion engine having an intake manifold fluidly coupled to a compressor adapted to receive ambient air through an air conduit of the engine, a first sensor positioned at least one of inside and outside the air conduit and configured to measure a first water content in the ambient air, and a second sensor positioned at least one of inside the intake manifold and upstream of the intake manifold and configured to measure a second water content in the intake manifold.

19 Claims, 3 Drawing Sheets

(12) United States Patent

US 7,389,771 B2

CLOSED LOOP EGR CONTROL METHOD AND SYSTEM USING WATER CONTENT MEASUREMENT

TECHNICAL BACKGROUND

The present invention generally relates to systems for controlling the position of a variable position valve, and more specifically to systems for controlling the position of an Exhaust Gas Recirculation (EGR) valve for an internal combustion engine.

BACKGROUND OF THE INVENTION

When combustion occurs in an environment with excess oxygen and high combustion temperatures, the formation of unwanted emissions such as oxides of nitrogen (NOx) occurs. This problem is aggravated through the use of turbocharger machinery operable to increase the mass of fresh air flow, which increases the concentrations of oxygen and nitrogen present in the combustion chamber when temperatures are high during or after a combustion event.

One known technique for reducing unwanted emissions such as NOx involves introducing chemically inert gases into the fresh air flow stream for subsequent combustion. By reducing the oxygen concentration of the resulting charge to be combusted, the fuel burns slower and peak combustion temperatures are reduced, thereby lowering the production of NOx.

In an internal combustion engine environment, such chemically inert gases are readily abundant in the form of exhaust gases, and one known method for achieving the foregoing result is through the use of an EGR system operable to introduce (i.e., recirculate) the exhaust gas from the exhaust manifold into the fresh air stream flowing to the intake manifold. EGR operation is typically not required under all engine operating conditions, and known EGR systems accordingly include a device, commonly referred to as an EGR valve, for specifically and controllably introducing the exhaust gas to the intake manifold.

Some EGR control strategies use an on-board microprocessor to control the EGR valve as a function of information supplied by a number of engine operational sensors. Other strategies control the EGR valve through the use of delta pressure sensors across an orifice or air mass flow sensors. All of these strategies, however, are prone to errors across wide ranges of operation and environmental conditions. Accordingly, what is needed in the art is a control strategy that overcomes these problems.

SUMMARY OF THE INVENTION

The present invention provides a system and method for controlling the EGR valve using water content measurement. In accordance with one aspect of the present invention, an internal combustion engine system includes an internal combustion engine having an intake manifold fluidly coupled to a compressor adapted to receive ambient air through an air conduit of the engine, a first sensor positioned at least one of inside and outside the air conduit and configured to measure a first water content in the ambient air, and a second sensor positioned at least one of inside the intake manifold and upstream of the intake manifold and configured to measure a second water content in the intake manifold.

In accordance with another aspect of the present invention, the internal combustion engine system includes an internal combustion engine having an intake manifold fluidly coupled to a compressor adapted to receive ambient air through an air conduit of the engine, a first sensor positioned at least one of inside and outside the air conduit and configured to measure a first water content in the ambient air, a second sensor positioned at least one of inside the intake manifold and upstream of the intake manifold and configured to measure a second water content therein, the second sensor adapted to generate an intake manifold water content signal corresponding to the second water content, and a controller coupled to the first sensor and to the second sensor and configured to use the ambient air water content signal and the intake manifold water content signal to determine a water intake content value.

In accordance with still aspect of the present invention, the internal combustion engine system includes an internal combustion engine having an intake manifold fluidly coupled to a compressor adapted to receive ambient air through an air conduit of the engine; and a means positioned at least one of inside and outside the intake manifold and configured to measure a gaseous content in the intake manifold.

In accordance with still another aspect of the present invention, a method of controlling a valve device includes the steps of measuring a first water content in the ambient air, measuring a second water content in the intake manifold, comparing the first and second water contents to a desirable water content, and controlling the valve device corresponding to a difference between the first and second water contents and the desirable water content.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
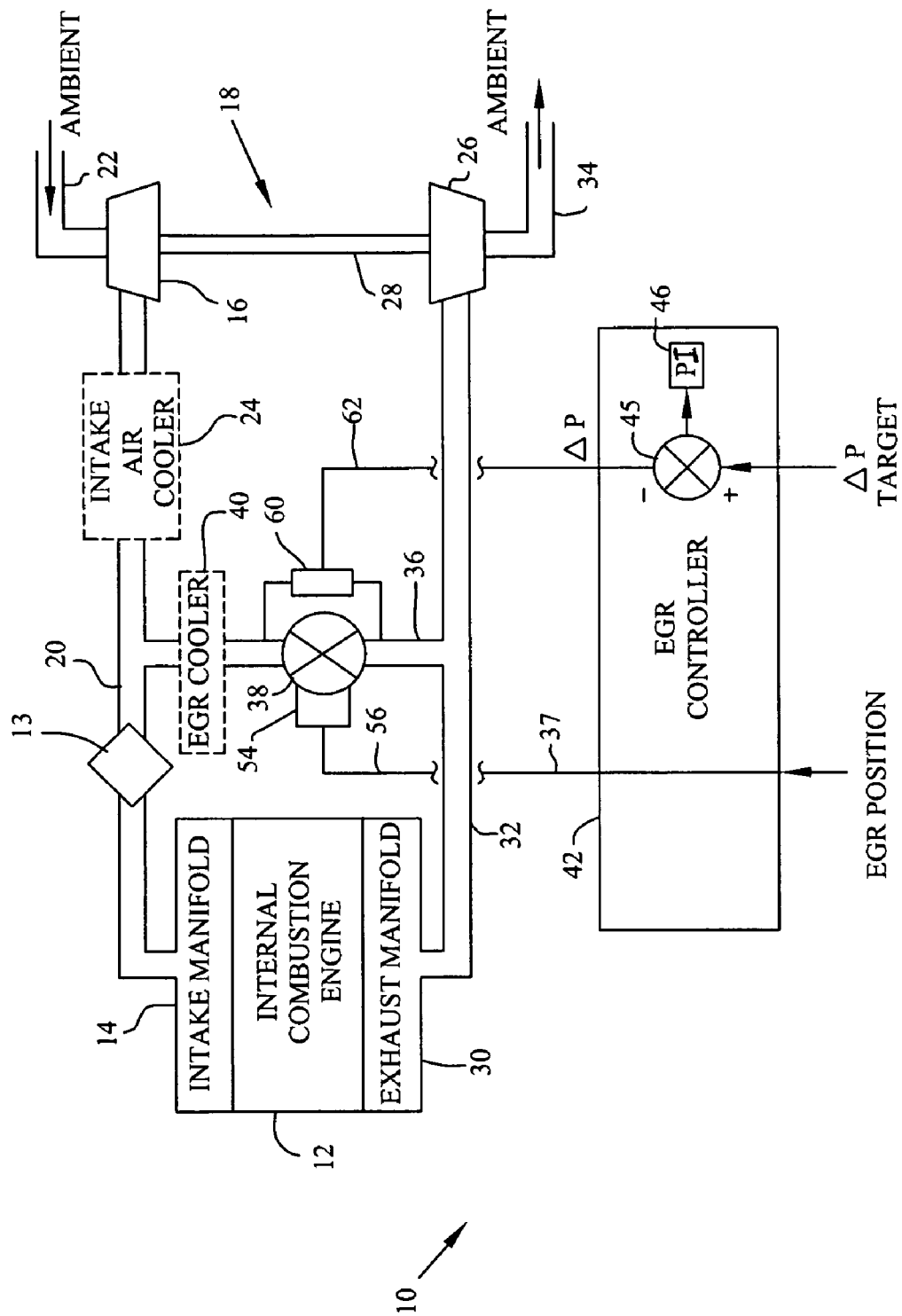
FIG. 1 is a diagrammatic illustration of a prior art internal combustion engine system.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

FIG. 1 shows a prior art internal combustion engine system for controlling the position of the EGR valve. Internal combustion engine system 10 includes internal combustion engine 12 having intake manifold 14 fluidly coupled to compressor 16 of turbocharger 18 via intake conduit 20, wherein compressor 16 receives fresh air via fresh air conduit 22. System 10 may also include air intake cooler 24 disposed in line with intake conduit 20 between compressor 16 and intake manifold 14. Compressed air passes through cooler 24 to mixer 13 where it is then combined with recirculated exhaust (i.e., EGR).

Turbocharger compressor 16 is mechanically coupled to turbocharger turbine 26 via driveshaft 28, wherein turbine 26 is fluidly coupled to exhaust manifold 30 via exhaust manifold conduit 32 and is further in fluid connection with ambient air via exhaust conduit 34. Exhaust manifold conduit 32 is fluidly coupled to intake conduit 20 via EGR conduit 36 having valve 38 disposed in line therewith. EGR cooler 40 may be disposed between valve 38 and intake conduit 20.

Exhaust gas exiting engine 12 through exhaust manifold 30 passes through valve 38 (or any other device useful for regulating the flow of gaseous material, e.g., a throttle, intake valve, exhaust valve or variable valve) of known construction, and a portion of the exhaust gas may be diverted through EGR cooler 40 disposed between valve 38 and intake conduit 20. Valve 38 is close-loop controlled to regulate the EGR quantity so as to achieve an EGR ratio set in accordance with the operating conditions of internal combustion engine 12. ΔP sensor 60 is disposed across valve 38 to sense a pressure change, or delta pressure, across valve 38.

System 10 includes electronic EGR controller 42. Controller 42 has a first input receiving a signal indicative of desired EGR position, and has a first output electrically connected to valve 38 via signal path 37. Controller 42 is configured to apply the EGR position signal directly to valve 38. Controller 42 also includes a second input receiving a signal indicative of a desired delta pressure value, or ΔP target, and a third input electrically connected to ΔP sensor 60 via signal path 62 and receiving a signal indicative of sensed delta pressure (ΔP). The ΔP value is subtracted from the ΔP target value at summing node 45, and a produced ΔP error value is applied to proportional-integral (PI) controller 46. An output of controller 42 (not shown) then produces a signal that is used to control the efficiency of turbocharger 18 by way of known techniques. Charge flow to intake manifold 14, i.e., the sum of fresh air flow into intake conduit 20 and EGR flow into intake conduit 20, is controlled by the position of valve 38 and the pressure differential between exhaust conduit 32 and intake conduit 20.

Figure 2:
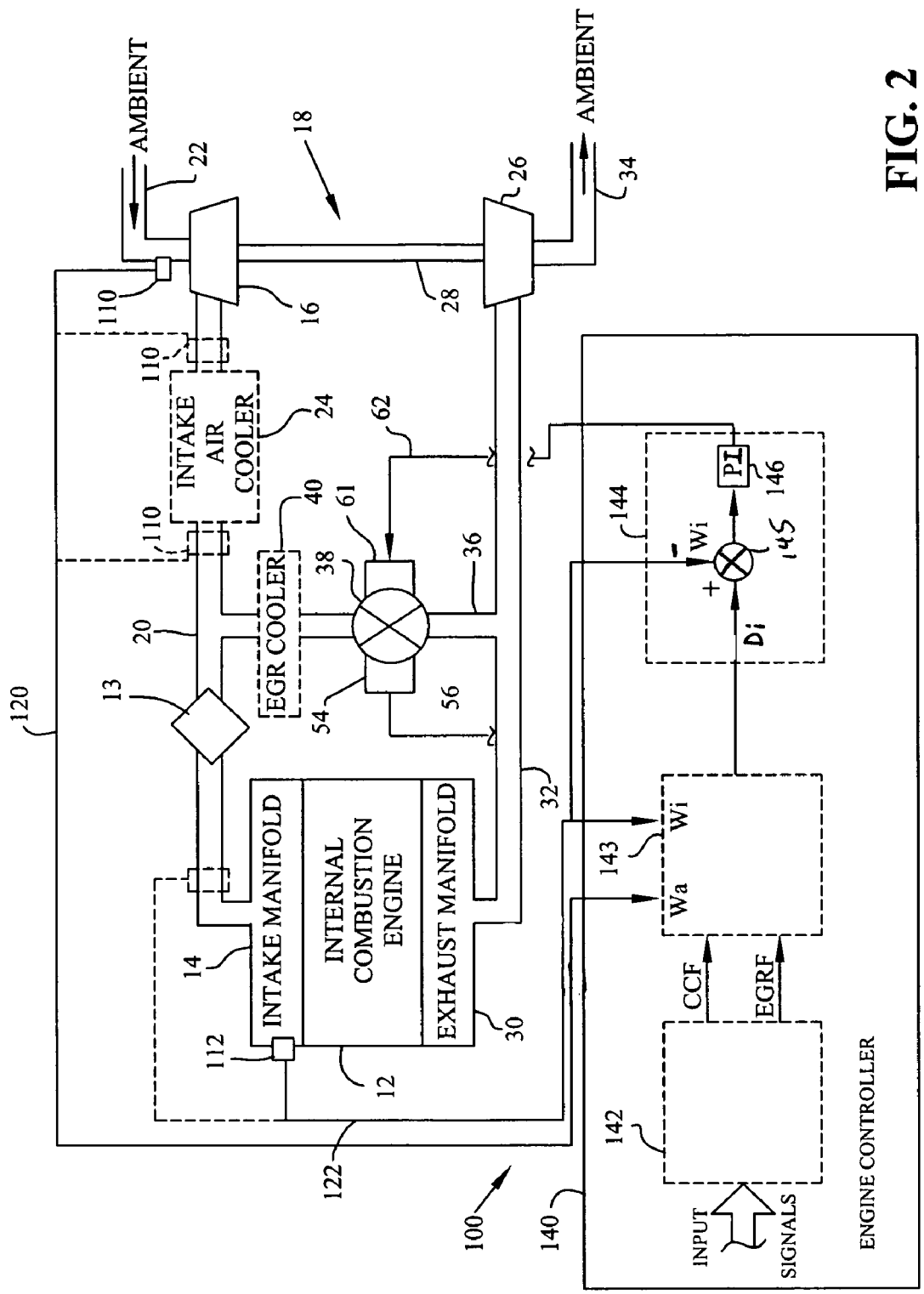
FIG. 2 is a diagrammatic illustration of an embodiment of the internal combustion system of the present invention.

Closed loop EGR system 100 of the present invention is shown in FIG. 2. System 100 includes several components in common with system 10 of FIG. 1, and like numbers are therefore used to identify like components. For example, system 100 includes internal combustion engine 12 having intake conduit 20 fluidly coupling intake manifold 14 to compressor 16. Fresh air conduit 22 passes ambient air to compressor 16. System 100 may also include air intake cooler 24 disposed in line with intake conduit 20 between compressor 16 and intake manifold 14. Compressed air passes through cooler 24 to mixer 13 where it is then combined with EGR.

Turbocharger compressor 16 is mechanically coupled to turbocharger turbine 26 via driveshaft 28, wherein turbine 26 is fluidly coupled to exhaust manifold 30 via exhaust manifold conduit 32 and is further in fluid connection with ambient air via exhaust conduit 34. Exhaust manifold conduit 32 is fluidly coupled to intake conduit 20 via EGR conduit 36 having valve 38 disposed in line therewith. EGR cooler 40 may be disposed between valve 38 and intake conduit 20.

System 100 includes ambient air sensor 110 and intake air sensor 112. Ambient air sensor 110 is positioned so as to be in contact with ambient air received by internal combustion engine 12. Accordingly, ambient air sensor 110 may be positioned upstream of compressor 16, upstream of intake air cooler 24, or anywhere upstream of mixer 13. Ambient air sensor 110 can also be positioned outside of the vehicle in which system 100 is included. Intake air sensor 112 may be positioned in intake manifold 14 or anywhere upstream of intake manifold 14 and downstream of mixer 13.

System 100 further includes engine controller 140. Controller 140 may be any of a number of known control units, including, for example, an electronic or engine control module, an electronic or engine control unit, or a general control circuit capable of performing the functions described below. In accordance with one aspect of the present invention, engine controller 140 includes logic block 142, logic block 143 and logic block 144. Logic blocks 142, 143, 144 may be implemented in software as one or more control algorithms responsive to a number of engine operating conditions. Logic block 142 includes a number of inputs for interfacing with various sensors and systems coupled to engine 12 and receives multiple input signals, including, but not limited to, engine speed, throttle command, coolant temperature, diagnostics indicative of no faults, intake manifold pressure and intake manifold temperature. Logic block 142 uses these input signals to produce a commanded charge flow (CCF) value and an EGR fraction (EGRF) value.

Ambient air sensor 110 is electrically connected to ambient air water input (Wa) (referred to as $y_A$ herein) of logic block 143, and air intake sensor 112 is electrically connected to intake air water input (Wi) (referred to as $y_{mix}$ herein) of logic block 143. Sensors 110, 112 measure water in fresh air and in the exhaust stream, respectively. In other embodiments of the present invention, sensor 112 is operable to measure $CO_2$ content, thereby enabling system 100 to operate without ambient air sensor 110.

Sensor 110 produces an ambient air water content signal on signal path 120 indicative of the water content in the ambient air, and air intake sensor 112 produces an intake air water content signal on signal path 122 indicative of the water content in intake manifold 14. Logic block 143 then determines a water content value by using data provided by the ambient air water content signal and the intake air water content signal as is further described below.

In a general sense, the non-reacting mixing process associated with EGR may be expressed as:

$$(y_{A,Air}A + y_{B,Air}B_{+...}) + \\ Y_{fuel}(y_{A,fuel}A + y_{B,fuel}B + ...) + Y_{EGR}(y_{A,egr}A + y_{B,egr}B_{+...}) = [ \\ 1 + Y_{fuel} + Y_{EGR}](y_{A,mix}A + y_{B,mix}B + ...) \quad (1)$$

where $y_{i,j}$=Mole fraction of species i in the $j^{th}$ non-reacting stream $Y_{fuel}$=Moles of upstream mixed fuel per mole of fresh air $Y_{EGR}$=Moles EGR per mole of fresh air In the case of no upstream mixed fuel, $Y_{fuel}$=0. Therefore, (1) becomes (when solving for $Y_{EGR}$)

$$Y_{EGR} = \frac{y_{A,mix} - y_{A,air}}{y_{A,egr} - y_{A,mix}} \quad (2)$$

$$\text{Units} = \left(\frac{moles\, EGR}{moles\, fresh\, air}\right)$$

Then, the mass fraction of EGR becomes $$X_{EGR} \equiv \frac{mass\, EGR}{mass\, charge} = \frac{mass\, EGR}{mass\, freshcharge + mass\, EGR} \quad (3)$$

and $$\frac{mass\, EGR}{mole\, Fresh\, Air} = Y_{EGR} * MW_{EGR} \quad (4)$$

Following substitution of (2) and (4) into (3) yields $$X_{EGR} = \left[\frac{Y_{EGR} MW_{EGR}}{MW_{Air} + Y_{EGR} MW_{EGR}}\right] \quad (5)$$

In a system, such as system 100, that senses $H_2O$ in (2), the substitution yields $$EGRF = X_{EGR} = \frac{\frac{(y_{H20,mix} - y_{H20,Air})MW_{EGR}}{y_{H20,EGR} - y_{H20,mix}}}{MW_{Air} + \left(\frac{y_{H20,mix} - y_{H20,Air}}{y_{H20,EGR} - y_{H20,mix}}\right)MW_{EGR}} \quad (6)$$

where
$MW_{EGR}$=molecular weight of EGR
$MW_{Air}$=molecular weight of air =28.9646
For a fuel of type $CH_B$, (where B=moler hydrogen to carbon ratio) then $MW_{EGR}$ is determined by the following:
The number of moles combustion air (fresh air) per mole of fuel carbon is $$a \equiv (A/F)_{wet} * \frac{MW_C + BMW_H}{MW_{air} + \frac{P_{vap}}{P_{baro}} M_{H_2O}} \quad (7)$$

$$= (A/F)_{wet} * \frac{MW_C + BMW_H}{MW_{air} + Y_{H_2O,air} MW_{H_2O}}$$

Where
$MW_C$=molecular weight of carbon
$MW_H$=molecular weight of Hydrogen
$MW_{H_2O}$=molecular weight of $H_2O$
$P_{vap}$=vapor pressure
$P_{baro}$=barometric pressure
The number of moles of water vapor in the combustion air (fresh air) per mole of fuel carbon is $$b \equiv a \frac{P_{vap}}{P_{baro} - P_{vap}} \quad (8)$$

Thus, the exhaust gas (EGR) water vapor concentration is $$y_{HxO,egr} = \frac{b + B/2}{a + b + B/4} \text{ by species balance} \quad (9)$$

Similarly for $CO_2$, $O_2$, $N_2$, and Argon $$y_{CO2,egr}, dry = \frac{y_{CO_2,Air,dry} + 1}{a - B/4} \quad (10)$$

where $y_{CO_2,Air,dry} = 0.00033$;

$$y_{CO2,egr}, wet = \frac{ay_{CO_2,egr}, dry + 1}{a + b + B/4} \quad (11)$$

$$Y_{O_2,egr,wet} = \frac{ay_{O2,air,dry} - (B/4) - 1}{a + b + B/4} \quad (12)$$

where $y_{O2,Air,dry} = .20946$;

$$y_{N_2,egr,wet} = \frac{ay_{N2,Air,dry}}{a + b + B/4} \quad (13)$$

where $y_{N2,Air,dry} = .78087$;

and $$y_{Argon,egr,wet} = \frac{ay_{Argon,air,dry}}{a + b + B/4} \quad (14)$$

where $Y_{Argon,Air,dry} = 0.00934$.

Consequently, $$MW_{EGR} = y_{CO_2,EGR,wet}MW_{CO_2} + y_{H_2O,EGR,wet}MW_{H_2O} + \quad (15)$$
$$y_{O_2,EGR,wet}MW_{O_2} + y_{N_2,EGR,wet}MW_{N_2} + y_{Argon,EGR,wet}MW_{Argon}$$

Controller 140 controls system 100 to achieve a desired EGR fraction denoted as $X_{EGR_{Target}} = EGR_T$.

From equation (5), it can be determined that $$X_{EGR_T} = \frac{Y_{EGR}MW_{EGR}}{MW_{air} + Y_{EGR}MW_{EGR}} \quad (16)$$

Solving for $Y_{EGR}$ yeilds $$Y_{EGR} \frac{X_{EGR_T}MW_{air}}{MW_{EGR}(1 - X_{EGR_T})} \quad (17)$$

From equation (2), where $H_2O$ is tracked (hereinafter, the species notation is omitted), it can be determined that $$Y_{EGR} = \frac{y_{mix} - y_A}{y_{EGR} - y_{mix}} \quad (18)$$

Equating (17) and (18) yields $$\frac{y_{mix} - y_A}{y_{EGR} - y_{mix}} = \frac{X_{EGR_T}MW_{Air}}{MW_{EGR}(1 - X_{EGR_T})}$$

Thus, solving for $y_{mix}$ (hereinafter denoted as the desired $y_{mix} = y_{mixT}$)

$$y_{mixT} = \frac{\left(\frac{X_{EGR_T} \cdot MW_{Air}}{MW_{EGR} * (1 - X_{EGR_T})}\right) * y_{EGR} + y_A}{1 + \left(\frac{X_{EGR_T} \cdot MW_{Air}}{MW_{EGR} + (1 - X_{EGR_T})}\right)} \quad (19)$$

Equation (19) permits derivation of the desired water concentration in the intake, $y_{mix}{}^T$, which is also referred to as $D_i$ herein. Thus, $$y_{egr} \equiv y_{H_2O,EGR} = (9)$$

and $$MW_{exh} = MW_{EGR} = (15)$$

and $$y_A = \frac{P_{vap}}{P_{baro}} = \text{measured} = W_a \text{ herein.}$$

Thus, given a target $X_{EGR_T}$, equation (19) can be solved explicitly for the desired water concentration in the intake. Likewise, for any delta change in target $X_{EGR_T}$ as determined by the feedback, a delta change in $y_{mixT}$ can be determined.

Logic block 144 subtracts the intake air water input (Wi) from the desirable water content value (Di) at summing node 145, and the produced delta water content value is applied to PI controller 146. An output of PI controller 146 then produces a signal on signal line 62 that is used to control valve 38 via valve actuator 61.

Figure 3:
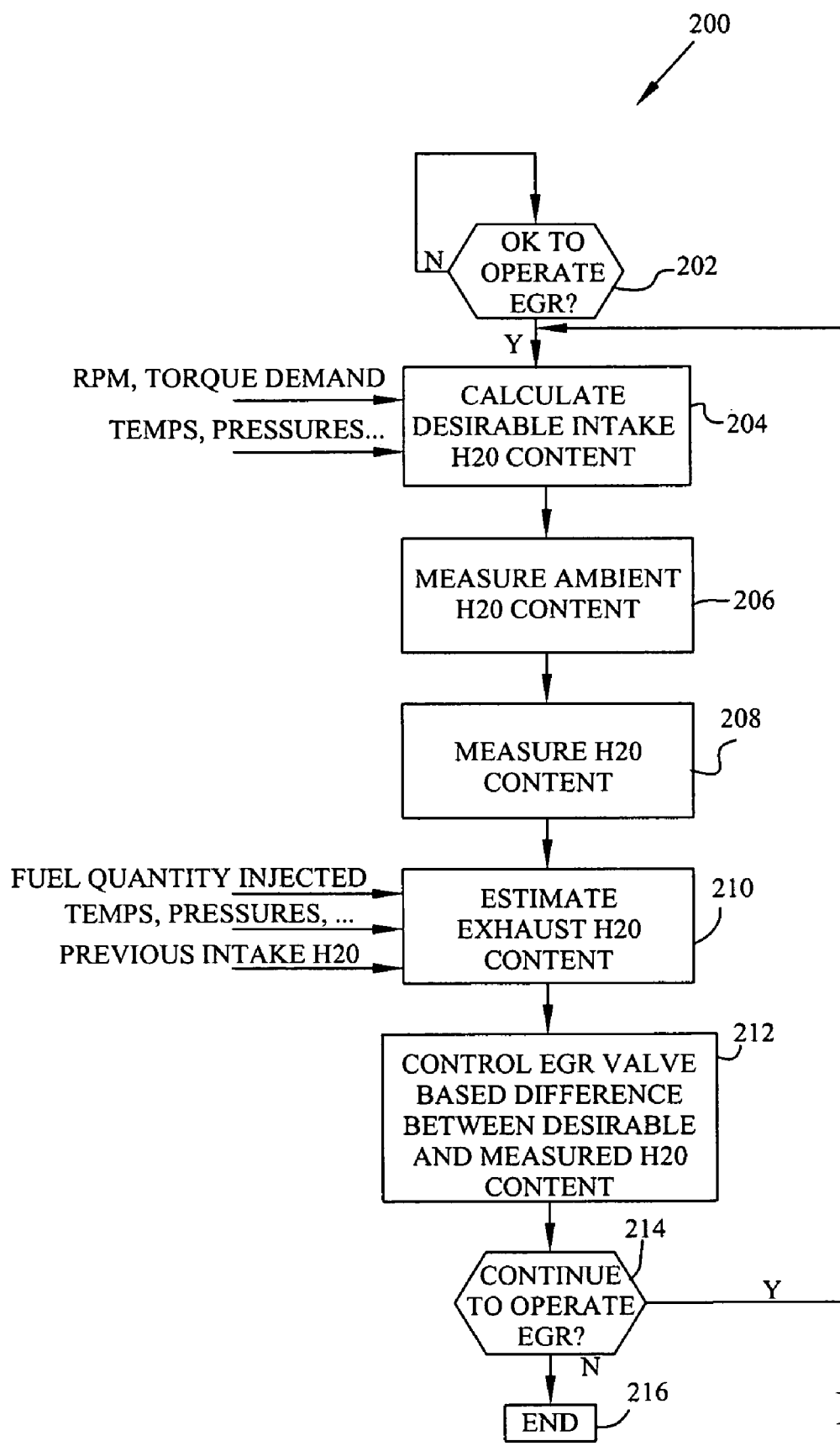
FIG. 3 is a flowchart illustrating an embodiment of a software algorithm executed by the control unit in order to control the EGR valve in accordance with one embodiment of the present invention.

Referring now to FIG. 3, a flowchart is shown illustrating an exemplary embodiment of algorithm 200 for controlling valve 38 in accordance with the present invention. Software embodying algorithm 200 is preferably stored within memory 141 of and is executable by controller 140. Algorithm 200 begins at step 202 where controller 140 determines whether the operational conditions of internal combustion engine 12 (e.g., engine speed, throttle command, coolant temperature, diagnostics indicative of no faults, intake manifold pressure and intake manifold temperature) are suitable to operate the EGR. If the conditions are not suitable, the execution of algorithm 200 loops back to step 202 until controller 140 determines that the EGR can be operated. If controller 142 determines that engine 12 conditions are suitable to operate the EGR, at step 204 controller 140 calculates the desirable water content value (Di) based on a desirable EGR rate. The desirable EGR rate is dependent upon the torque demands of internal combustion engine 12, the revolutions per minute of engine 12, ambient air temperature, EGR cooler 40 temperature, intake manifold 14 temperature, coolant temperature, intake manifold 14 pressure, exhaust manifold 30 pressure and other factors. Based on this known data, controller 140 may obtain the desirable EGR rate from a look-up table stored in memory 141.

After controller 140 calculates the desirable water content value, algorithm 200 instructs ambient air sensor 110 at step 206 to measure the water content in the ambient air and instructs intake air sensor 112 at step 208 to measure the water content in the intake manifold.

Controller 140 at step 210 estimates the water content in the exhaust as described above. In estimating the water concentration in the exhaust, controller 140 uses data regarding the fuel injection quantity of engine 12, estimated intake charge mass, ambient air temperature, EGR cooler 40 temperature, intake manifold 14 temperature, coolant temperature, intake manifold 14 pressure, exhaust manifold 30 pressure, and the previous concentration of water in intake manifold 14. At step 212, controller 140 determines a difference between the desirable water content value and the water content value from data corresponding to the ambient air water signal and the intake air water signal received at respective inputs Wa, Wi. Controller 140 then uses the error between the desirable water content value and the water content value to provide a corresponding signal via signal path 62 to control valve 38. At step 214, controller 142 determines whether to continue to operate the EGR based on the conditions evaluated at step 202. If controller 140 determines to continue the operation of the EGR, execution of algorithm 200 returns to step 204. In one embodiment, controller 140 executes the above-described algorithm every 10-20 milliseconds. If controller 140 determines to discontinue the operation of the EGR, execution of algorithm 200 ends at step 216.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method of controlling a valve device in fluid communication with an intake manifold of an internal combustion engine, the intake manifold coupled to a compressor adapted to receive ambient air through an air conduit of the engine, said method comprising the steps of:
   measuring a first water content in the ambient air;
   measuring a second water content in the intake manifold;
   comparing the first and second water contents to a desirable water content; and controlling the valve device corresponding to a difference between the first and second water contents and the desirable water content.

2. The method of claim 1 wherein said step of controlling includes a step of close-loop commanding the valve device to a position to modify an EGR airflow into the intake manifold.

3. The method of claim 1 further comprising a step of calculating the desirable water content.

4. The internal combustion engine system of claim 1 wherein the step of controlling the valve device includes sensed water content to estimate EGR airflow.

5. An internal combustion engine system comprising:
   an internal combustion engine having an intake manifold fluidly coupled to a compressor adapted to receive ambient air through an air conduit of the engine; and
   a means positioned at least one of inside and outside the intake manifold and configured to measure a gaseous content in the intake manifold, said means configured to receive data corresponding to an ambient gaseous content signal and an intake gaseous content signal, wherein said means is configured to determine a desired gaseous content value.

6. The internal combustion engine system of claim 5 wherein the gaseous content includes $CO_2$.

7. The internal combustion engine system of claim 5 wherein the means is configured to correspond to sensed water content to obtain the desired gaseous content value.

8. An internal combustion engine system comprising:

an internal combustion engine having an intake manifold fluidly coupled to a compressor adapted to receive ambient air through an air conduit of the engine;

a first sensor positioned at least one of inside and outside the air conduit and configured to measure a first water content in the ambient air, wherein said first sensor is configured to generate an ambient air water content signal corresponding to the first water content; and a second sensor positioned at least one of inside the intake manifold and upstream of the intake manifold and configured to measure a second water content in the intake manifold, wherein said second sensor is configured to generate an intake air water content signal corresponding to the second water content; and an engine controller coupled to said first sensor and to said second sensor, said controller configured to calculate a water content value from the ambient air water content signal and the intake air water content signal, and determine an error between the water content value and a desired water content value.

9. The internal combustion engine system of claim 8 further comprising a turbine coupled to the compressor.

10. The internal combustion engine system of claim 9 further comprising an exhaust manifold conduit coupled to the compressor, and an EGR conduit coupling the exhaust manifold conduit to an intake conduit of the engine, the EGR conduit having a valve device disposed therein.

11. The internal combustion engine system of claim 9 further comprising a valve actuator coupled to the valve device and said engine controller, said actuator responsive to a control signal for modifying the valve device's position.

12. The internal combustion engine system of claim 11 wherein the controller is configured to generate a control signal to the actuator based on the error between the water content value and the desired water content value.

13. The internal combustion engine system of claim 11 wherein the control signal corresponds to the error, wherein the error utilizes sensed water content to estimate EGR airflow.

14. An internal combustion engine system comprising:

an internal combustion engine having an intake manifold fluidly coupled to a compressor adapted to receive ambient air through an air conduit of the engine;

a first sensor positioned at least one of inside and outside of the air conduit to measure a first water content in the ambient air, said first sensor adapted to generate an ambient air water content signal corresponding to the first water content;

a second sensor positioned at least one of inside the intake manifold and upstream of the intake manifold and configured to measure a second water content therein, said second sensor adapted to generate an air manifold water content signal corresponding to the second water content; and a controller coupled to said first sensor and to said second sensor and configured to use data corresponding to the ambient air water content signal and the intake air water content signal to determine a water intake content value, wherein said controller is configured to determine a desired water content value.

15. The internal combustion engine system of claim 14 further comprising a turbine coupled to the compressor.

16. The internal combustion engine system of claim 15 further comprising an EGR conduit fluidly coupling the exhaust conduit to an intake conduit of the engine, said EGR conduit having a valve device disposed therein.

17. The internal combustion engine system of claim 16 further comprising a valve actuator coupled to the valve device, said valve actuator responsive to a control signal for modifying the valve device's position.

18. The internal combustion engine system of claim 17 wherein said controller is configured to generate the control signal based on the desired water content value.

19. The internal combustion engine system of claim 17 wherein the valve acutator is configured to modify the valve device's position to correspond to sensed water content to estimate EGR airflow.

* * * * *